United States Patent [19]

Gleinig et al.

[11] 4,402,701
[45] Sep. 6, 1983

[54] LEATHER DYEING AGENTS AND THEIR PREPARATION: MEMBRAME SEPARATION OF DYE MOTHER LIQUOR

[75] Inventors: Harald Gleinig, Odenthal; Hans-Heinz Mölls, Leverkusen; Jochen Koll, Odenthal; Gottfried Dick, Leverkusen; Reinhold Hörnle, Cologne; Friedrich Kunert, Leverkusen, all of Fed. Rep. of Germany

[73] Assignee: Bayer Aktiengesellschaft, Leverkusen, Fed. Rep. of Germany

[21] Appl. No.: 304,239

[22] Filed: Sep. 21, 1981

[30] Foreign Application Priority Data

Oct. 10, 1980 [DE] Fed. Rep. of Germany ....... 3038393

[51] Int. Cl.³ .......................... C09B 67/54; D06P 3/32
[52] U.S. Cl. ........................................... 8/436; 8/437; 8/440; 8/543; 8/661; 8/676; 8/680; 8/687
[58] Field of Search ........................... 8/436, 440, 437

[56] References Cited

U.S. PATENT DOCUMENTS

| | | | |
|---|---|---|---|
| 3,989,452 | 11/1976 | Hugelshofer | 8/564 |
| 4,179,267 | 12/1979 | Lacroix et al. | 8/585 |
| 4,328,220 | 5/1982 | Abel et al. | 8/582 |

FOREIGN PATENT DOCUMENTS

| | | |
|---|---|---|
| 37382 | 10/1981 | European Pat. Off. . |
| 41240 | 12/1981 | European Pat. Off. . |
| 2948292 | 6/1981 | Fed. Rep. of Germany . |
| 1359898 | 7/1974 | United Kingdom . |
| 2015018 | 9/1979 | United Kingdom . |

*Primary Examiner*—A. Lionel Clingman
*Attorney, Agent, or Firm*—Sprung, Horn, Kramer & Woods

[57] ABSTRACT

Leather dyeing agents, which can be obtained by concentrating, by means of a membrane separation process, the mother liquors, which are produced in the salting-out process in the preparation of organic dyestuffs which are water-soluble or which contain groups imparting water-solubility, the mother liquors having an extinction in the absorption maximum which is $\geq 500$, with a layer thickness of 10 cm, and by drying the concentrate, if appropriate.

15 Claims, No Drawings

LEATHER DYEING AGENTS AND THEIR PREPARATION: MEMBRAME SEPARATION OF DYE MOTHER LIQUOR

The invention relates to leather dyeing agents which can be obtained, by means of a membrane separation process, from the mother liquors produced in the preparation of water-soluble organic dyestuffs and/or organic dyestuffs containing groups which impart water-solubility.

Dyestuffs which must comply with specific requirements in fastness properties, for example fastness to light and fastness to washing, substantivity, shade and colour effect, are employed for dyeing textile substrates of the most diverse kind, such as cotton, wool, silk etc.

It is therefore urgently necessary in the production of such dyestuffs, to separate them from coloured by-products which do not have the required properties. This separation is preferably effected by salting-out of the desired dyestuff and subsequent filtration. The undesirable by-products occur in dissolved form in the mother liquor, which has a high content of salts.

There has been no lack of attempts to work up economically the mother liquors produced in the preparation of dyestuffs, and it would be most advantageous to put the coloured by-products and waste products to a meaningful use in the colouration of materials.

These processes are hindered by the fact that these products, in many cases, are present in a concentrated salt solution, which yields very low tinctorial strength powders on drying. Only a part of the colouring by-products can be isolated by acidification, quite apart from the fact that this method is very expensive and, in addition, is associated with an additional inorganic pollution of the waste water.

It has now surprisingly been found that valuable leather dyeing agents can be obtained by concentrating, by means of a membrane separation process, the mother liquors which are produced in the salting-out process in the preparation of water-soluble organic dyestuffs or organic dyestuffs containing groups which impart water-solubility, and by drying the concentrate, if appropriate. Those mother liquors are employed, the extinction of which, with a layer thickness of 10 cm, is $\leq 500$ in the absorption maximum.

Mother liquors which can be employed in the process according to the invention are produced, for example, in the salting-out of the following dyestuffs which are water-soluble and/or contain groups which impart water-solubility: monoazo, diazo or polyazo dyestuffs, formazan, anthraquinone, anthrapyridone, nitro, methine, styryl, azastyryl, naphthoperinone, quinophthalone or phthalocyanine dyestuffs.

Mother liquors are preferably employed, which are produced in the salting-out of azo dyestuffs, in particular polyazo dyestuffs, according to one or several of the following operations: diazotisation and coupling, formation of urea, introduction of fibre-reactive groups, metallisation, saponification.

Furthermore, those mother liquors are preferably employed, which are produced in the isolation of anthraquinone dyestuffs and of metal-containing and metal-free phthalocyanine dyestuffs, after the sulphonation and, if appropriate, subsequent introduction of fibre-reactive groups.

Membrane separation processes are described in detail in the literature, for example in U.F. Franck, Dechema-Monographie 75, 1452 to 1458, 9/37 (1974), in the form of reverse osmosis, ultrafiltration, dialysis or electrodialysis. Pressure permeation, that is reverse osmosis and ultrafiltration, is preferably applied, during which process the penetration of water and any dissolved substances through the semi-permeable membrane takes place under the driving force of a hydrostatic pressure which exceeds the osmotic pressure. The pressure permeation for the process according to the invention can be carried out using all commercial pressure permeation devices. Such devices can be in the form of, for example, plate, frame, tube, flexible tube, coil, hollow fibre or hollow fine fibre modules.

Membranes which can be used according to the invention and which can be installed in the previously mentioned modules are, for example, those of cellulose, cellulose diacetate or cellulose triacetate, or those of synthetic polymers, such as, for example, polyamides, polyolefins and polysulphones. Membranes of porous glass or "dynamic" membranes, formed from heavy metal oxides and, in part, water-soluble polymers, such as, for example, polyacrylic acid, can also be used.

Membranes of the previously mentioned type are described, for example, in U.F. Franck (loc. cit., page 2) and Hwang, Kammermeyer: Membranes in Seperations (Techniques of Chemistry) volume 7, 1975, Wiley, New York. The dissolved coloured by-products are predominantly, preferably completely, held back, and the inorganic salts are predominantly allowed to pass, by the membranes which can be used. Such membranes have a molecular cut off level of molecular weight (MW) 100–10,000. Membranes with a cut off level of approximately MW 300–6,000 are preferably employed. The pressure permeation is preferably carried out at pressures between 0.5 and 60 bars. The pH value and the temperature are not critical, with respect to the membranes, for the operation of the separation process, since suitable membranes are available for all pH and temperature ranges. More than 50%, preferably more than 75%, of the starting volume of the mother liquors is withdrawn as a permeate. The concentrate obtained is preferably subjected to a drying process, particularly a thermal drying process, and any required shading can be effected before or after the drying process. The resulting dyestuff powder can then be dyed on leather according to known dye processes.

The use, according to the invention, of substance mixtures which can be obtained by concentrating, by means of a membrane separation process, the mother liquors which are produced in the salting out process in the preparation of dyestuffs which are water-soluble or which contain groups which impart water-solubility, and by drying the concentrate, represents a particularly economical process for the preparation of leather dyeing agents.

The following procedure is followed in the determination of the extinction of the mother liquor.

20 ml of the mother liquor are adjusted to pH 7 with dilute sodium hydroxide solution or dilute sulphuric acid, and the solution is made up to 100 ml with distilled $H_2O$. This solution is centrifuged in a laboratory centrifuge for 5 minutes at 4,000 rpm. The solution above the residue is then diluted to such an extent that the absorption spectrum can be measured in a commercial photometer. According to the layer thickness of the cell used, the extinction in the absorption maximum must be related to a layer thickness of 10 cm.

EXAMPLE 1

The preparation of the dyestuff, which, in the form of the free acid, corresponds to the formula

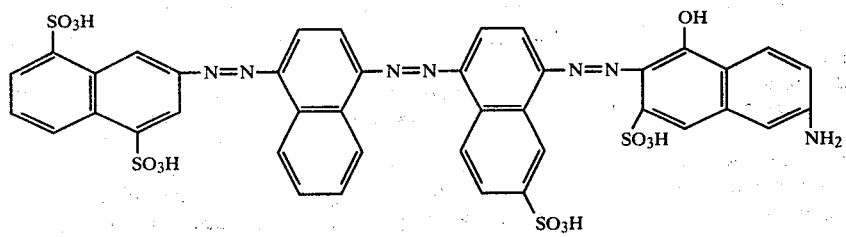

is effected in the customary manner by diazotisation of 2-amino-4,8-disulphonic acid, coupling of the product with 1-aminonaphthalene, and renewed diazotisation and coupling of this product with 1-aminonaphthalene-7-sulphonic acid. The product is again diazotised and is coupled with 6-amino-1-naphthol-3-sulphonic acid. After the dyestuff has been salted out with NaCl, the mixture is filtered.

20 m³ of the mother liquor are adjusted to pH 6 with 650 kg of concentrated HCl of pH 9.1. The mother liquor is concentrated, during the course of 56 hours, in the following industrial plant:

| | |
|---|---|
| Membrane surface area of the module | 19 m² |
| Membrane cut off level | MW 6,000 |
| Membrane material | polysulphone |
| Pressure | 40 bars |
| Temperautre | 50° C. |
| Volume flow through the module | 8.5 m³/hour |

2.8 m³ of concentrated mother liquor are obtained, from which, by evaporation of the water, 320 kg of a dyestuff powder are obtained, which yields a violet shade when dyed on leather. Only 12% of the total COD charge of the original mother liquor is still present in the approximately 17.8 m³ of permeate (COD=-chemical oxygen demand).

EXAMPLE 2

The preparation of the dyestuff, which, in the form of its free acid, corresponds to the formula

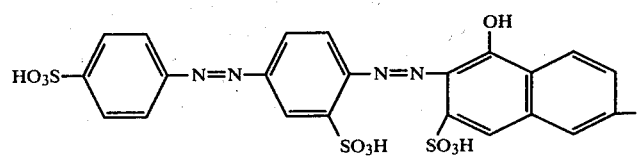

is effected in the customary manner by diazotisation of 4-aminoazobenzene-3,4'-disulphonic acid, and coupling of the product with After the sulphonic acid ester has been saponified in a known manner, the dyestuff is salted out with NaCl, and is isolated by filtration.

10 m³ of the mother liquor of the dyestuff are adjusted to pH 6 with 40 l of concentrated HCl of pH 9.3. The mother liquor is concentrated, in the course of 28 hours, in the same plant and under the same conditions as described in Example 1. 1 m³ of concentrated mother liquor is obtained, from which, by evaporation of the water, 360 kg of a dyestuff powder are obtained, which yields a red shade when dyed on leather. Only 32% of the total COD charge of the original mother liquor is still present in the approximately 9 m³ of permeate.

EXAMPLE 3

The dyestuff of the formula which is prepared in the customary manner by diazotisation of 4-aminoazobenzene-3,4'-disulphonic acid and coupling of the product with m-aminophenylurea, is salted out, and is isolated by filtration.

20 m³ of the mother liquor are adjusted to pH 6 with 550 l of 40% NaOH of pH 3.7. The mother liquor is concentrated, in the course of 38 hours, in the same plant and under the same conditions as in Example 1, but using another membrane. The membrane used consists of an aromatic polyamide derivative and has approximately the same cut off level as the membrane in Example 1. 2.6 m³ of concentrated mother liquor are obtained, from which, by evaporation of the water, 300 kg of a dyestuff powder are obtained, which yields a red shade when dyed on leather.

EXAMPLE 4

The dyestuff, which, in the form of its free acid, corresponds to the formula

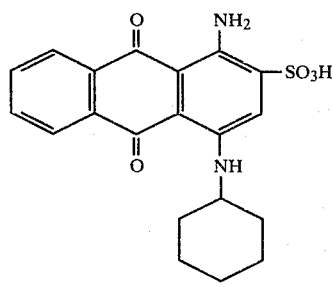

is prepared in the customary manner by reaction of 4-bromo-1-aminoanthraquinone-2-sulphonic acid with cyclohexylamine, and is isolated by salting-out (see B.I.O.S. Final Report No. 1484, page 30 and F I A T Final Report No. 1313, page 213 et seq.).

20 m³ of the mother liquor of the dyestuff are adjusted to pH 6 with approximately 90 kg of concentrated HCl of pH 12.5. In the same plant as in Example 1, 17 m³ of permeate are withdrawn, in the course of 54 hours, at 30° C., 40 bars and a volume flow through the module of 8.5 m³/hour, using a cellulose acetate membrane (cut off level MW 500, $R_{NaCl}$ (=retention for NaCl: approximately 30%). The concentrate yields a grey-blue shade when dyed on leather.

We claim:

1. Leather dyeing agents, which can be obtained by concentrating, by means of a membrane separation process, the mother liquors, which are produced in the salting-out process in the preparation of organic dyestuffs which are water-soluble or which contain groups imparting water-solubility, the mother liquors having an extinction in the absorption maximum which is $\geq 500$, with a layer thickness of 10 cm, and by drying the concentrate.

2. Leather dyeing agents according to claim 1, which can be obtained by employing, in the membrane separation process, the mother liquors which are produced in the salting-out process in the preparation of monoazo, disazo or polyazo dyestuffs, formazan, anthraquinone, anthrapyridone, nitro, methine, styryl, azastyryl, naphthoperinone, quinophthalone or phthalocyanine dyestuffs.

3. Leather dyeing agents according to claim 1, which can be obtained by employing, in the membrane separation process, the mother liquors which are produced in the salting-out of azo dyestuffs in the preparation by means of diazotisation and coupling.

4. Leather dyeing agents according to claims 1 or 3, which can be obtained by employing, in the membrane separation process, mother liquors which are produced in the salting-out in the preparation of polyazo dyestuffs.

5. Leather dyeing agents according to claim 1, which can be obtained by employing, in the membrane separation process, the mother liquors which are produced in the salting-out in the preparation of anthraquinone dyestuffs by sulphonation and/or introduction of fibre-reactive groups.

6. Leather dyeing agents according to claim 1, which can be obtained by employing, in the membrane separation process, the mother liquors which are produced after the preparation of metal-containing or metal-free phthalocyanine dyestuffs by means of sulphonation.

7. Leather dyeing agents according to claim 1, which can be obtained by having subjected the concentrates, obtained by means of the membrane separation process, to a thermal drying process.

8. Leather dyeing agents according to claim 1, which can be obtained by subjecting the mother liquors to pressure permeation.

9. Leather dyeing agents according to claim 8, which can be obtained by carrying out the pressure permeation at pressures of between 0.5 and 60 bars.

10. Leather dyeing agents according to claims 8 or 9, which can be obtained by employing, in the pressure permeation, membranes which have a molecular cut off level of molecular weight 100 to 10,000.

11. A leather dyeing agent according to claim 10, wherein said membrane has a molecular cut off level of molecular weight 300 to 6,000.

12. A leather dyeing agent according to claim 1, wherein following membrane separation of said mother liquor the concentrate containing leather dyeing agent is dried.

13. Leather dyeing agents according to claim 1, which can be obtained by employing, in the membrane separation process, the mother liquors which are produced in the salting-out of azo dyestuffs in the preparation by means of diazotisation and coupling together with either urea formation or the introduction of fibre-reactive groups or metallisation.

14. A leather dyeing agent according to claim 6, wherein said metal containing or metal free phthalocyanine dyestuff is one containing a fibre reactive group.

15. A process for dyeing leather which comprises contacting said leather with a dyeing agent obtained by means of a membrane separation process performed on the mother liquor obtained in the salting-out process during the preparation of an organic dyestuff which is water soluble or contains groups which impart water insolubility, said mother liquor having an extinction in the absorption maximum which is equal or greater than 500, with a layer thickness of 10 cm.

* * * * *

UNITED STATES PATENT AND TRADEMARK OFFICE
CERTIFICATE OF CORRECTION

PATENT NO. : 4,402,701

DATED : September 6, 1983

INVENTOR(S) : Harald Gleinig et al

It is certified that error appears in the above-identified patent and that said Letters Patent is hereby corrected as shown below:

Col. 3, line 33          Delete "Temperautre" and insert
                         --Temperature--

Col. 5, line 49          After "cm" change "," to --.-- and
                         delete remainder of sentence Signed and Sealed this Sixth Day of March 1984

[SEAL]

Attest:

GERALD J. MOSSINGHOFF

Attesting Officer        Commissioner of Patents and Trademarks